G. C. KENNEDY.
SLIDING KNOCKDOWN FREIGHT CARRIER.
APPLICATION FILED JAN. 25, 1918. RENEWED SEPT. 26, 1921.
1,415,244.
Patented May 9, 1922.
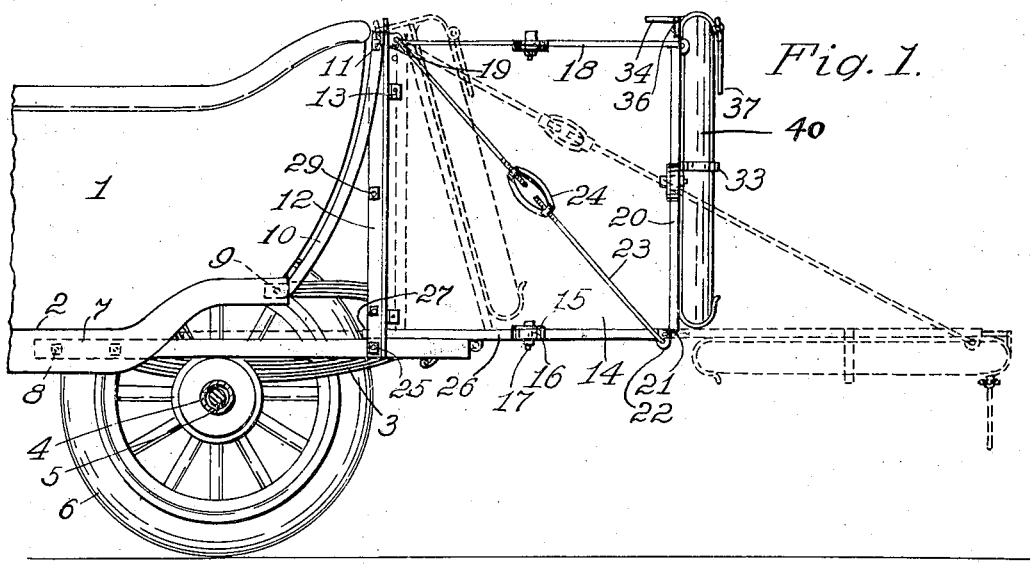
Fig. 1.
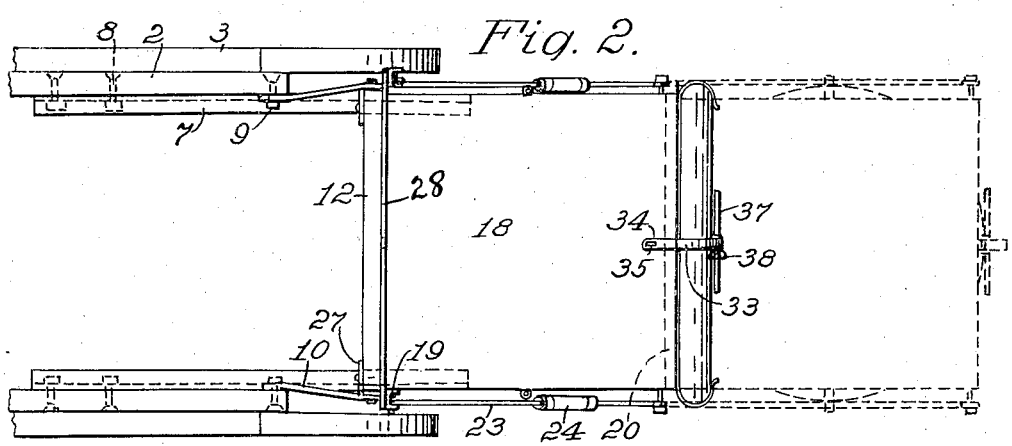
Fig. 2.
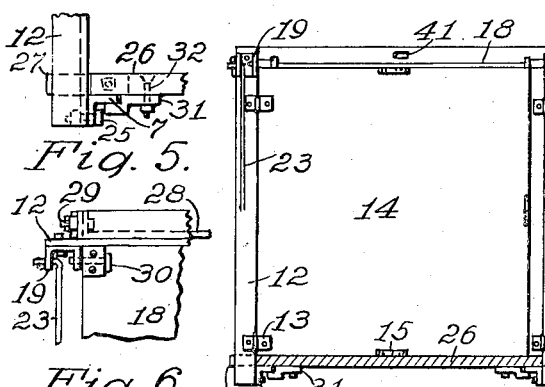
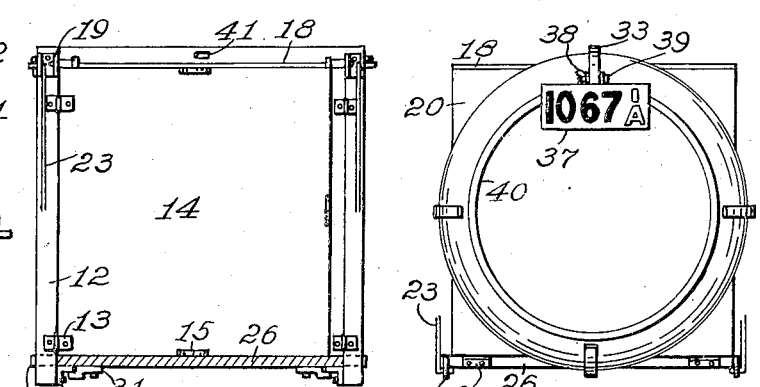
Inventor,
George Colvin Kennedy.

UNITED STATES PATENT OFFICE.

GEORGE COLVIN KENNEDY, OF WATERLOO, IOWA.

SLIDING KNOCKDOWN FREIGHT CARRIER.

1,415,244.

Specification of Letters Patent.   Patented May 9, 1922.

Application filed January 25, 1918, Serial No. 213,695.   Renewed September 26, 1921.   Serial No. 503,379.

*To all whom it may concern:*

Be it known that I, GEORGE COLVIN KENNEDY, a citizen of the United States of America, and a resident of Waterloo, Blackhawk County, Iowa, have invented certain new and useful Improvements in Sliding Knockdown Freight Carriers, of which the following is a specification.

My invention relates to improvements in sliding knock-down freight-carriers for vehicles, and the object of my improvement is to supply a device of this character adapted for use as an auxiliary freight- or bundle-carrier on the rear part of a motor- or other vehicle, which may be extended for use and variously arranged to transport freight of different dimensions, and also adapted to be retracted and collapsed when not in use.

This object I have accomplished by the means which are hereinafter described and claimed, and which are illustrated in the accompanying drawings, in which Fig. 1 is a side elevation of my improved sliding knock-down freight-carrier as mounted on the rear of a motor vehicle and in which the full lines show the device extended to a carrying position, and the dotted lines showing it in the respectively extended and collapsed positions; Fig. 2 is a top plan view of Fig. 1; Fig. 3 is a transverse section of said device looking forwardly, showing in rear elevation the swinging side-closures in their collapsed positions; Fig. 4 is a rear elevation of the raised rear section of the extensible platform; Fig. 5 is a detail view of one of the sliding-connections between the slidable platform and its supporting-means, and Fig. 6 is a detail view of one of the pivotal connections of the swinging top-closure.

Similar numerals of reference denote corresponding parts throughout the several views.

The numeral 1 denotes the rear part of the body of a motor-car of the passenger-carrying type. This body is mounted on a chassis having frame-bars 2 whose rear ends are resiliently supported on the springs 3, which latter are mounted upon the axles 5 carried on the wheels 6.

My knock-down freight-carrier is mounted removably on the rear ends of the frame-bars 2. Horizontal rearwardly-directed angle-bars 7 are bracketed on the frame-bars 2 by bolts 8. These arms or brackets 7 have the lower ends of the upright members of an inverted U-shaped angle-bar 12 secured thereto near the rear end of the body 1 by means of bolts 25. Brace-bars 10 are connected fixedly to and between the rear extremities of the frame-bars 2 and the upper parts of the upright members of said U-shaped angle-bar 12 by bolts 9 and 11 respectively. The angle-bar standard 12 has a front transverse plate 28 (Fig. 5) secured to its upright members by means of bolts 29.

A sliding platform, made up of front and rear sections 26 and 20 hinged together at 21 to permit the rear section 20 to swing upwardly only, is slidingly mounted on the bracket-arms 7 to slide longitudinally thereon. The forward section of the platform is slidably interlocked with the flanges of the arms 7 by means of clips 31 secured to the lower face of the said forward section by bolts 32 and extends beneath the flanges, as clearly illustrated in Figure 5 of the drawings. The clips 31 are of angular formation and are spaced from the side edges of the front section of the platform. The sliding movement of the platform is limited by stops 27 located at opposite sides of the front section of the platform and secured to the front edge of the same and projecting laterally beyond the side edges of the front section of the platform for engaging the upright side portions of the angle bar 12, as clearly illustrated in Figure 2 of the drawings.

When the platform 26 is pushed forwardly it extends under the rear part of the body 1 with but little projecting rearwardly therefrom. Swinging side-closures 14 are hinged on the upright members of the standard 12 by means of the hinges 13, and swing inwardly over the forward section of said platform when the latter is extended rearwardly to overlap each other when collapsed as shown by the dotted lines in Fig. 1. A swinging top-closure 18, as shown in Fig. 6, has pintles 30 pivotally mounted in orifices in channel-bars 19 fixed on the adjacent upright members of the standard 12. The parts 14, 18 and 20, and the platform 26 have like pairs of orificed opposed ears 15 and 16 respectively adapted to be brought into registration when the parts on which they are fixed are abutted and then detachably secured together by means of bolts 17. When the device is extended the raised rear section of the platform, as shown in Fig. 1, may be supported by means of sectional brace-rods 23, whose parts are adjustably connected by means of turn-buckles 24, connected between said channel-bars 19 and lugs 22 on the platform.

The rear section 20 of the platform may be lowered to a horizontal position in order to carry objects of longer dimensions than could be transported in the device when brought into its box form, and in this case longer brace-rod sections are employed to support the rear end of said section, as shown by dotted lines in Fig. 1.

I have provided means for carrying an extra tire on the device. This consists of spring-clips 33 fixed on the lower or rear face of the rear section of said extensible platform to releasably carry a tire 40. I have also shown a license number-plate 37 pivotally mounted on the rear section of said platform, pivoted by a pivot-bolt on a clip 33 and held in an adjusted position by means of a thumb- or wing-nut 38, so that the number-plate may always be visible whether the device be in its extended or its collapsed positions.

To hold the parts of the device when collapsed, I employ a hasp 34 hinged at 36 to the said rear section or a clip 33, and passed through a slot 41 in the horizontal member of the standard 12. The hasp has a slot 35 to receive the bolt of a lock or other fastening device.

My improved extensible carrier may be used when extended and folded into enclosed box form, to transport bundles or goods and keep them from exposure to the elements, and when the rear section of the platform is lowered, may be employed to carry long or bulky yet relatively light articles. When fully collapsed together, after the platform has been retracted, the device is inconspicuous, compact, yet readily accessible for use.

Having described my invention, what I claim as new, and desire to secure by Letters Patent, is:

1. A sliding knockdown freight carrier mounted on means for transportation, said carrier comprising a platform slidably mounted on the said means for transportation, a supporting element extending upwardly at opposite sides of the platform and rigidly connected with the means for transportation, and knockdown elements carried by the platform and the said supporting element and co-acting with the said slidable platform in one position to form therewith an enclosed hollow receptacle.

2. A sliding knockdown freight carrier, mounted on means for transportation, said carrier comprising a platform element, slidably mounted on the means for transportation and movable longitudinal of the same, a supporting element fixedly mounted on the said means for transportation and extending upwardly at opposite sides of the said platform and having a top portion extending across the platform element, and knockdown closure elements associated with the platform element and with the supporting element at the sides and top thereof and adapted in one position to form a closed receptacle.

3. A sliding knockdown freight carrier, comprising spaced guide bars having means for securing them to means for transportation at opposite sides thereof, a platform element slidably along the guide bars, a vertical front plate fixedly supported over the guide bars, a back plate hinged to the platform element and arranged to swing downwardly to form an extension of the said element, means for detachably securing said back plate in a raised position when the platform element is moved forwardly, to place the back plate in proximity to the front plate, and means for connecting the back plate with the front plate for supporting the back plate in an extended horizontal position and also for maintaining the back plate in a vertical position in spaced relation with the front plate.

4. A sliding knockdown freight carrier, comprising spaced guide bars having means for securing them to means for transportation at opposite sides thereof, a platform element slidable along the guide bars, a vertical front plate fixedly supported over the guide bars, a back plate hinged to the platform element and arranged to swing downwardly to form an extension of the said element and carried to and from the front plate by the sliding movement of the platform and side plates hinged at opposite sides of the front plate and foldable inwardly over the same, and a top plate hinged at the top of the front plate and adapted to fold downwardly.

5. A sliding knockdown freight carrier, comprising spaced guide bars, provided with means for securing them to a vehicle at opposite sides thereof and extending rearwardly therefrom, a supporting element composed of spaced sides and a connecting top portion and rigidly connected with the vehicle, a platform element slidably interlocked with the guide bars, a back plate hinged to the rear of the platform element, and foldable against the supporting element and carried to and from the same by the sliding movement of the platform, side plates hinged to the side portions of the supporting element, and a top plate hinged to the supporting element at the connecting top portion thereof.

6. A sliding knock-down freight carrier comprising spaced guide bars having means for securing them to means for transportation at opposite sides thereof, a supporting element having spaced sides and rigidly connected with the said means for transportation, a platform element slidable along the guide bars and movable between the sides of the supporting element, a back plate hinged to the platform element and arranged to swing downwardly into a horizontal position to form an extension of the platform and adapted to be arranged in a vertical position and to be carried to and from the supporting element by the sliding movement of the platform.

7. The combination with a vehicle having a rear axle and carrying-wheels mounted thereon, of a platform movable longitudinally past the rear axle to and from a position of extension rearwardly from the vehicle, and supporting-means upon said rear axle upon which said platform is slidably mounted, supported, and releasably secured.

8. The combination with a vehicle having a rear axle and carrying-wheels mounted thereon, of a platform movable longitudinally past the rear axle to and from a position of extension rearwardly from the vehicle, supporting-means upon said rear axle upon which said platform is slidably mounted, supported, and releasably secured, a member hinged to the rear end of said platform, and means for supporting said member in different positions relative to the platform.

Signed at Waterloo, Iowa, this 11th day of January, 1918.

GEORGE COLVIN KENNEDY.